United States Patent [19]

Iyer

[11] Patent Number: 4,900,125
[45] Date of Patent: Feb. 13, 1990

[54] OPTICAL COUPLING METHOD
[75] Inventor: Lokanathan M. Iyer, Seattle, Wash.
[73] Assignee: Abbott Laboratories, Abbott Park, Ill.
[21] Appl. No.: 222,145
[22] Filed: Jul. 21, 1988
[51] Int. Cl.[4] ............................................. G02B 6/38
[52] U.S. Cl. ............................ 350/96.21; 350/96.20; 350/96.22
[58] Field of Search ............... 350/96.20, 96.21, 96.22, 350/96.29

[56] References Cited

U.S. PATENT DOCUMENTS

| | | | |
|---|---|---|---|
| 4,186,999 | 2/1980 | Harwood et al. | 350/96.21 |
| 4,192,575 | 3/1980 | Hodge | 350/96.21 |
| 4,201,443 | 5/1980 | Hodge | 350/96.20 |
| 4,201,618 | 5/1980 | Lewis | 156/380 |
| 4,212,514 | 7/1988 | Prunier et al. | 350/96.21 |
| 4,307,933 | 12/1981 | Palmer et al. | 350/96.16 |
| 4,431,260 | 2/1984 | Palmer | 350/96.15 |
| 4,493,528 | 1/1985 | Shaw et al. | 350/96.15 |
| 4,496,215 | 1/1985 | Shaheen et al. | 350/96.23 |
| 4,506,946 | 3/1985 | Hodge | 350/96.21 |
| 4,526,711 | 7/1985 | Sacher et al. | 252/582 |
| 4,573,760 | 3/1986 | Fan et al. | 350/96.21 |
| 4,594,121 | 6/1986 | Mitch | 156/158 |
| 4,690,502 | 9/1987 | Zimmerman et al. | 350/96.29 |

Primary Examiner—John D. Lee
Assistant Examiner—Phan T. Heartney
Attorney, Agent, or Firm—Christensen, O'Connor, Johnson & Kindness

[57] ABSTRACT

Method of reversibly coupling optical fibers using an elastomeric composition adhered to the end of at least one optical fiber. The elastomeric composition remains stable after multiple connections and disconnections and protects the ends of the optical fibers from damage unlike conventional coupling gels or epoxy resin adhesives.

23 Claims, 1 Drawing Sheet

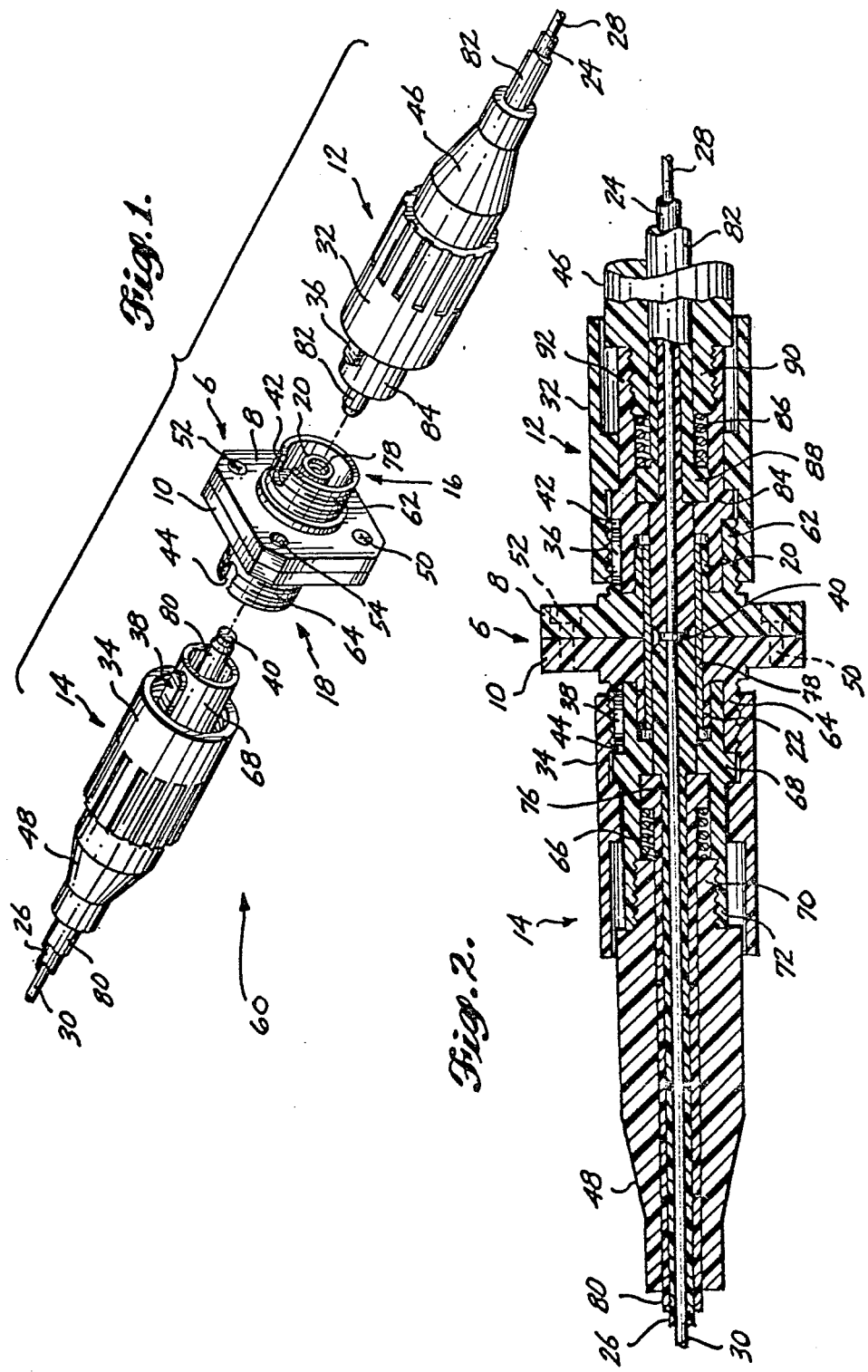

OPTICAL COUPLING METHOD

BACKGROUND OF THE INVENTION

The present invention relates to an improved method of coupling optical waveguides together.

Optical waveguides technology, such as optical fibers for the transmission of information-bearing light signals, is now an established art. The fiber optic technology has found widespread application in the telecommunications, medical, and electronic industries. Much developmental work has been devoted to providing optical fibers of materials that lose only low levels of light. In order to take full advantage of the development of such low-loss materials in the fiber optic industry, practical connections must be provided so that the optical fibers may be easily coupled to each other. The ease of mechanical connection and the amount of transmitted light lost in the connection because of reflection, misalignment, or fiber surface effects are prime concerns in the design of a connector for optical fibers. These connections should allow the optical fibers to be reversibly coupled to each other so that repeated connections may be made between distinct optical fibers lengths. Also, the connections must provide an optical pathway between distinct optical fibers that allows the transmission of light from one optical fiber to another without reflection back along the fiber axis. For reasons well established in the art, it is desirable that the optical pathway include materials that have an index of refraction substantially equal to the index of refraction of the optical fibers.

Several methods are known for coupling optical fibers together; for instance, it is known that epoxy resins may be used to permanently adhere one optical fiber to another optical fiber. The epoxy resin is normally chosen so that the index of refraction of the epoxy resin is close to the index of refraction of the optical fiber, thus minimizing the reflection of light back along the fiber axis as the transmitted light passes through materials having a different index of refraction. Another method of coupling optical fibers uses a coupling gel that is placed in the interface between adjacent optical fibers. The index of refraction of the coupling gels preferably matches the index of refraction of the optical fibers and provides a medium through which the transmitted light passes from one optical fiber to the other optical fiber. Coupling gels, however, are generally viscous materials that tend to flow out or be squeezed out of the interface between the adjacent optical fibers and therefore do not lend themselves to repeated connections. Also, coupling gels are generally prepared from materials that tend to absorb moisture over time, thus resulting in an unpredictable change in the index of refraction of the coupling gel.

U.S. Pat. No. 3,914,015 to McCartney reports a transparent interface component that has an index of refraction consistent with the index of refraction of a plurality of optical fibers to be coupled. The transparent interface component is structurally independent of each of the plurality of optical fibers that are coupled together. The component appears to be held in position by the compressive forces supplied by the optical fibers and the alignment sleeves surrounding the optical fibers.

U.S. Pat. No. 3,910,678 to McCartney et al. provides an annular-shaped sleeve of a transparent optical interface material that occupies the interface between a first plurality of optical fibers to be connected to a second plurality of optical fibers. The transparent interface is held in place by an alignment sleeve that surrounds the transparent interface and the optical fibers. The transparent interface is structurally independent of both the first and second plurality of optical fibers. In both the '015 and '678 patents, the index of refraction of the transparent interface is consistent with the index of the refraction of the optical fibers to be coupled to each other.

The use of structurally independent transparent interfaces between optical fibers to be coupled to each other suffers from the drawback that the compressive or shearing forces encountered between the interface and the fibers when aligning and connecting the optical fibers may result in substantial damage to the terminal ends of the optical fibers. Any damage that occurs to the ends of the optical fibers can result in a substantial increase in the amount of light reflected back along the axis of the fiber or the amount scattered at the interface. Also, the structurally independent transparent interface must be independently fabricated to predetermined dimensional tolerances in order to cooperate with the alignment sleeve.

SUMMARY OF THE INVENTION

The present invention is a method of coupling a primary optical waveguide to a secondary optical waveguide. The method provides a coupling that can be repeatedly connected and unconnected. The method includes the steps of formulating an elastomeric composition, having an index of refraction $n_2$ in the cured state that is substantially equal to the index of refraction $n_3$ of the optical waveguides. The uncured elastomeric composition is applied to the first end of the primary optical waveguide, and then the elastomeric composition is subjected to curing conditions. The cured elastomeric composition provides an optical interface between the primary optical waveguide and the second optical waveguide that minimizes the reflection of light back along the waveguide axis or scattering of light at the interface. The primary optical waveguide and the secondary optical waveguide are then optically aligned so that the amount of light reflected and scattered at the interface of the primary optical waveguide and the secondary optical waveguide is further minimized. The preferred components of the elastomeric composition include a difunctional oligomer, a monofunctional oligomer, a monofunctional monomer and an adhesion agent. By appropriately formulating the elastomeric composition to provide a cured elastomeric composition that has an index of refraction consistent with the index of refraction of the optical waveguides, the amount of light reflected or scattered due to the difference between the index of refraction of the cured elastomeric composition and the index of refraction of the optical waveguides is minimized.

The method of coupling optical waveguides can be used to provide fiber optic connectors that do not lose their ability to effective transmit light from one optical waveguide to another optical waveguide after repeated connections and disconnections. The cured elastomeric composition also serves to protect the ends of the optical waveguides from damage due to compressive or shearing forces during the connection. An additional advantage of the present invention is the ease with which the optical interface, i.e., elastomeric composition, is provided on the end of the optical waveguide.

Other objects, features, and advantages of the present invention will be readily apparent from the following description of certain preferred embodiments thereof, taken in conjunction with the accompanying drawings. It is understood that variations and modifications may be effected without departing from the spirit and scope of the novel concepts of the disclosure.

BRIEF DESCRIPTION OF THE DRAWINGS

FIG. 1 is an isometric view of a fiber optical connector in accordance with the present invention.

FIG. 2 is a longitudinal cross-sectional view of the fiber optic connector in FIG. 1 in accordance with the present invention.

DETAILED DESCRIPTION OF THE INVENTION

The term "substantially equal indices of refraction" means that the indices of refraction are such that light that contacts an interface between one material having an index of refraction $n_1$ and another material having an index of refraction $n_2$ is unaffected by an difference between the indices of refraction of the materials (i.e., the fresnel reflection is minimized).

Optical waveguides useful in the method of the present invention are well-established in the art. The optical waveguides are generally the type that are used for the transmission of information-bearing light signals. These optical waveguides are prepared from materials such as glass and plastic. A more detailed description of these types of optical waveguides can be found throughout the literature, for example, *Optics*, Hecht, Eugene and Alfred Zajac; and *Introduction to Classical and Modern Optics*, Meyer-Arendt, Jurgen R.

In accordance with the present invention, these optical waveguides are optically coupled together by aligning the optical waveguides for optimum transmission of light from one waveguide to the other waveguide with a cured elastomeric composition adhered to the end of at least one of the optical waveguides. The cured elastomeric composition is adhered to the end of the optical waveguide by applying the uncured elastomeric composition to the waveguide and then curing it in situ. The optical waveguide with the cured elastomeric composition adhered on its end is abutted against and aligned with the end of another optical waveguide in a manner that allows a maximum transmission of light and minimal reflection back along the axis of the optical fiber. The optical waveguides may be aligned and held in place by mechanical connections well established in the art, for instance, threaded female and male SMA or FC connectors, bayonet SN connectors, or special spring compressed ferrules and the like. Although the present invention is not intended to be limited to any particular method of aligning and abutting the optical waveguides, FIGS. 1 and 2 are exemplary of the types of mechanical connections that are useful in the present invention.

Referring to FIGSS. 1 and 2, a typical connector arrangement embodying the present invention includes a pair of male connectors represented generally by right male connector 12, left male connector 14, and an in-line connection housing generally represented by 6. The right and left male connectors are identical to each other except for the elastomeric composition 40 adhered to the rightmost end of the left male connector. The connection housing 6 includes mirror image parts generally represented by right half 8 and left half 10.

The right half 8 and left half 10 of the connection housing 6 are held together by screws 52 and 50 located in opposite corners of the generally square upright housing. The connection housing 6 also contains two screw holes 54 occupying the other corners of the connection housing 6. The screw holes 54 are designed such that they enable the connection housing 6 to be mounted within a support structure, such as a central connection box (not shown), where numerous individual optical fibers are coupled to each other. Because the right 8 and left 10 halves of the connection housing 6 are substantially mirror images of each other, the remaining description of the connection housing 6 will refer primarily to the right half 8 of the connection housing 6.

Extending perpendicularly outward from the face of the right half 8 of the connection housing 6 is a circular female connector 16 which includes a cylindrical outer threaded housing 62 and a guideway 20 positioned concentrically within the threaded housing 62. The threaded housing 62 extends from the face of the connection housing 6 a distance equivalent to approximately twice the width of the connection housing 6. The guideway 20 is lined with a metal liner 78 and extends from the face of the connection housing 6 a distance approximately equal to 1.5 times the thickness of the connection housing 6 such that the guideway 20 is recessed within the threaded housing 62. In the top edge of the threaded housing 62 is a void defining an alignment guide 42. The alignment guide 42 serves to align the male connector 12 within the female connector 16.

Because the left 14 and right 12 male connectors are essentially mirror images of each other, both male connectors will be described referring primarily to the left male connector 14. The male connector 14 includes a sleeve 68, a cylindrical coupler nut 34, a cylindrical body 48, a cylindrical fiber cladding 26, and a casing 80. Each of the cylindrical members, the sleeve and the casing share a common longitudinal axis that is defined by the optical waveguide 30, which is surrounded by the fiber cladding 26. For illustration purposes, the optical waveguide 30 has been enlarged. The fiber cladding 26 and optical waveguide 30 are circumferentially encased by the casing 80 which passes through the longitudinal cylindrical body 48 which includes threads 70 on its rightmost end. To the right of the threads 70, around the casing 80, is a short helical spring 66 which is compressed between the rightmost end of the body and whose rightward movement is restricted by a spring stop 76 defined by an enlarged diameter of the casing 80. The enlarged diameter extends to the right along the casing about 2 mm at which point the diameter of the casing reverts back to its original dimension. The cooperation between the end of the body 48, spring 66 and spring stop 76 serve to bias the casing 80, cladding 26 and waveguide 30 to the right.

The sleeve 68 is a longitudinal cylindrical body having threads 72 on the inner surface of its leftmost end for mating with the threads 70 of the body 48. The sleeve 68 including the threaded portion 72 has an inner diameter sufficient to pass over the spring 66 and spring stop 76. The interior of the sleeve 68 has a reduced diameter adjacent the right side of the spring stop 76 which serves to restrict the rightward bias of the casing 80. The reduced diameter extends to the right about 2 mm at which point the inner diameter increases to its original diameter. This original diameter continues to the right end of the sleeve and is slightly larger than the outer diameter of the guideway 22, thus allowing the guideway 22 to slide between the sleeve 68 and the casing 80. The right end of the sleeve terminates proximate the right end of the casing 80 and includes a boss 38 which is dimensioned to be received into the alignment guide 44, aligning the male connector 14 with the female connector 18.

Around the body 48 and sleeve 68 is rotatably and slidably mounted a longitudinal cylindrical coupler nut 34 whose right end is threaded to mate with the threaded portion of the threaded housing 64. When the nut is threaded onto the female connector 18, the sleeve 68 and accordingly the body 48, casing 80, cladding 26 and optical waveguide 30 is drawn to the right towards the connection housing 6. The dimension and configuration of the right end of the casing 80, sleeve 68 and the coupler nut 34 are such that they slidably cooperate with the female connector 18 to position the right end of the optical waveguide 30 centrally within the connection housing 6. The threaded housing 64 of the female connector 18 and the threaded portion of the coupler 34 cooperate to securely hold the male connector 14 in position. The end of the optical fiber 30 opposite the right end is continuously encased by the fiber cladding 26 and casing 80, and is generally connected to an optical light source or detection means (not shown).

As noted previously, the right and left halves of the connector 60 are essentially mirror images of each other; therefore, the right half of the connector 60, male connector 12, female connector 16, and the corresponding components, i.e., guideway 20, threaded housing 62, fiber cladding 24, casing 82, optical waveguide 28, sleeve 84, coupler nut 32, boss 36, spring 86, spring stop 88, alignment guide 42, threaded ends 90 and 92, and body 46 are identical to those described above with regard to the left half.

Still referring to FIG. 1, the left end of the left casing 80 and optical waveguide 30 has an elastomeric composition 40 adhered thereto. The elastomeric composition 40 covers the leading flat surface of the casing 80 in which resides the optical waveguide 30. When both the left 14 and right 12 male connector are coupled to the respective left 18 and right 16 female connector, the ends of the optical waveguides are intimately contacted inside the connection housing 6 with the elastomeric composition 40 positioned between the connection ends, providing an optical interface.

The elastomeric composition in the context of the present invention is a cured admixture of mono- and difunctional oligomers, at least one monofunctional monomer, an adhesion promoter and an initiator. The composition and viscosity of the elastomeric composition allows it to be directly applied to the end of an optical waveguide where the composition is cured in situ. When the optical waveguides are flexible, small fibers, their ends are usually supported by a casing, in these cases, the elastomeric composition can be applied to the end of the waveguide by applying it to the end of the casing. The cured elastomeric composition is an elastic property and has an index of refraction ranging from about 1.45 to about 1.55, depending on the relative ratios of the components. Although the present invention is described with regard to the preferred components and amounts of components suitable to provide an elastomeric composition that has an index of refraction substantially equal to that of the waveguides, it should be understood that the present invention is not limited to the specific amounts so long as the elastomeric composition is provided with the desired index of refraction and elastic properties. Other combinations and amounts of components may provide equally useful compositions in accordance with the present invention.

Suitable monofunctional oligomers useful in the elastomeric composition are of the type that contain a single functional group that can be crosslinked by the difunctional oligomers described more fully below. The monofunctional oligomer when crosslinked, exhibits minimal volume shrinkage from its initial volume in an uncrosslinked state, good tear and abrasion resistance, and good elastic elongation and adhesion properties. The minimal shrinking of the monofunctional oligomer is preferred to ensure the volume of uncrosslinked (i.e., uncured) elastomeric composition applied to the end of the optical waveguide is sufficient to provide a layer of crosslinked (i.e., cured) elastomeric composition that completely covers the end of the optical waveguide, including the fiber casing and will accordingly occupy the entire interface between the optical waveguides. The tear and abrasion resistance of the monofunctional oligomer provides an elastomeric composition that can tolerate strains and stresses associated with repeated connections and disconnections. Finally, the elasticity of the oligomer allows the elastomeric composition to be compressed during the coupling, thus insuring a continuous optical interface, free of inhomogeneities, such as air bubbles, that can affect the transmission and reflection of the light as it passes through the interface between the optical waveguides.

For elastomeric compositions having an index of refraction between 1.45 and 1.55, the preferred monofunctional and difunctional oligomers have an index of refraction that ranges between about 1.45 and about 1.55, though monofunctional and difunctional oligomers having an index of refraction between about 1.48 and 1.53 are most preferred. Particular examples of monofunctional oligomers include those containing $\alpha$- or $\beta$-unsaturated acrylates, examples of these oligomers include PurElast# 155A oligomer available from Polymer Systems. The PurElast TM 155A oligomer has an index of refraction of 1.5231 that has been found to be particularly advantageous when coupling optical fibers having an index of refraction ranging from about 1.45 to about 1.55.

The difunctional oligomers that are used to crosslink the monofunctional oligomer described above generally have difunctionality that allow them to chemically react with the functional group of the monofunctional oligomer to provide crosslinks between independent monofunctional oligomers. The crosslinking of the monofunctional oligomer serves to increase the solvent resistance as well as increase the viscosity of the elastomeric composition as it cures. Suitable difunctional oligomers include those containing $\alpha$- or $\beta$-unsaturated acrylates, examples of these oligomers include PurElast TM 155 oligomer available from Polymer Systems. The PurElast TM 155 oligomer has an index of refraction of 1.5270 that has been found to be particularly advantageous when coupling optical waveguides having an index of refraction between about 1.45 to about 1.55.

In order to apply the elastomeric composition containing the mono- and difunctional oligomers to the ends of the optical waveguide, it is desirable to reduce the viscosity of the mixture of oligomers by adding a monofunctional monomer. The monofunctional monomer does not contribute to the crosslinking due to its singular functionality; however, it may be crosslinked by the difunctional oligomer to other monomers or the monofunctional oligomers. The monofunctional monomer generally has a viscosity less than that of either of the oligomers and has an index of refraction that ranges between about 1.40 and 1.55, with monomers having an index of refraction between about 1.40 and 1.52 being preferred. The monomers include those containing α- or β-unsaturated acrylates, an example of these types of monomers include a 2-ethoxy ethoxy ethyl acrylate available from Atlantic Richfield Company under the trade name Sartomer TM 256. The Sartomer TM 256 monomer has an index of refraction of 1.4396 that has been found to be particularly advantageous when coupling optical fibers having an index of refraction between about 1.45 and 1.55.

Preferably, the elastomeric composition also includes an adhesion promoter that improves the adhesion of the elastomeric composition to the surfaces of the optical waveguide and the metal or plastic connectors encasing the ends of the waveguides. Because the index of refraction of the elastomeric composition is a prime concern, it is preferred that the adhesion promoter have an index of refraction between about 1.40 to about 1.55, preferably between about 1.40 to about 1.52. Examples of particularly useful adhesion promoters are unsaturated acids, such as acrylic acid that has an index of refraction of 1.4224.

In order to provide the cured elastomeric composition with its desired index of refraction, it is necessary to cure the uncured admixture of oligomers, monomer and adhesion promoter. Although the oligomers and monomer will cure at room conditions, for practical processing reasons it is advantageous to control the initiation of the curing and minimize the time required to cure the mixture. Therefore, the elastomeric composition preferably includes an initiator that is activated by ultraviolet (UV) light, visible light or heat. Because the elastomeric compositions are often applied to optical fibers that are encased by heat-sensitive plastic connectors, it is generally advantageous to use UV light or visible light as the activator to prevent melting of the connector. Where UV light is used, the initiator is preferably an alcohol containing photo-initiator, such as Darocur TM 1173, available from EM Sciences. The initiator has an index of refraction between about 1.45 and 1.55, with initiators having an index of refraction between 1.48 and 1.55 being preferred. Darocur TM 1173 has an index of refraction of 1.5361, which has been found to be particularly advantageous when coupling optical fibers having an index of refraction between 1.45 and 1.55.

The optical fibers that are advantageously coupled by the method of the present invention have an index of refraction ranging from about 1.45 to about 1.55, therefore to minimize the amount of light loss due to reflection and scattering at the interface of the optical fibers and the elastomeric composition, the index of refraction of the elastomeric composition is controlled within this same range, i.e., 1.45 to 1.55. Because each of the components of the elastomeric composition has an independent index of refraction, changing the ratios of the components allows the index of refraction of the entire composition to be changed without substantially affecting the physical properties of the elastomeric composition. For instance, with reference to a preferred elastomeric composition containing PurELast TM 155, PurElast TM 155A, Sartomer TM 256, acrylic acid and Darocur TM 1173, the overall index of refraction can be increased by preferably increasing the amount of PurElast TM 155 or PurElast TM 155A, if the amount of PurElast TM 155 or 155A is increased up to about 10 wt%, the overall index of refraction can be increased about 0.01 units. Also, increasing the PurElast TM 155 or 155A serves to increase the crosslinking of the elastomer which increases the toughness of the elastomer. If it is preferred to increase the index of refraction without increasing the amount of crosslinking, the amount of the monomer, Sartomer TM 256, can be increased. Increasing the amount of Sartomer TM 256 by about 10 wt% results in an increase in the index of refraction of about 0.01 units. To lower the overall index of refraction and crosslinking, the amount of PurElast TM 155 or 155A is preferably reduced, for example reducing the amount of PurElast TM 155 or 155A in the above composition by 10wt% reduces the overall index of refraction by about 0.01 units. Likewise, the index of refraction can be reduced up to 0.01 units without reducing the crosslinking by reducing the amount of Sartomer TM 256 by about 10 wt%. It should be understood that the exemplary means of controlling the index of refraction of the elastomeric composition are described above; however, the amounts of the other components can also be varied to adjust the overall index of refraction.

Because the ratio of amounts of the components of the elastomeric composition will vary depending on the desired index of refraction and other physical properties, the following ranges are not intended to be limiting, but only to illustrate the amounts that are useful in an elastomeric composition having an index of refraction between about 1.45 and 1.55.

TABLE 1

| COMPONENT | WT % |
| --- | --- |
| Monofunctional Oligomer | 20–50 |
| Difunctional Oligomer | 10–35 |
| Monofunctional Monomer | 30–60 |
| Adhesion Promoter | 1–5 |
| Initiator | 5–10 |

The index of refraction of the cured elaastomeric composition can be determined by measuring the index of refraction of the uncured elastomeric composition. It has been found that the index of refraction of the uncured elastomeric composition increases by about 0.01 to 0.02 units upon curing; therefore, to provide a cured elastomeric composition with an index of refraction $n_2$, the uncured elastomeric composition should have an index of refraction 0.01 to 0.02 units less than $n_2$. For example, for an optical waveguide having an index of refraction of about 1.497 an admixture of 35.8 wt% PurElast TM 155A oligomer, 17.9 wt% PurElast TM 155 oligomer, 35.8 wt% Sartomer TM 256, 3.5 wt% acrylic acid and 7.0 wt% Darocur TM 1173 provides a elastomeric composition that prior to curing has an index of refraction of about 1.483 and when cured provides a cured elastomeric composition that has an index of refraction of about 1.498.

The cured elastomeric composition is a soft, pliable, compressible, elastic polymer that is more viscous than the known coupling gels that are unstable and tend to flow out of the interface between optical waveguides being coupled together; however, the cured elastomeric composition, unlike the known solid epoxy resin adhesives that generally exhibit an index of refraction up to about 1.5 is flexible enough that it can be compressed when the optical waveguides are coupled to each other. The stability, elasticity and compressibility of the cured elastomeric composition is desirable for several reasons. First, the stability and the elasticity of the cured elastomeric composition provides a protective cushion between the ends of the optical waveguides preventing any damage to their terminal ends due to compressive or shearing forces during repeated connections and unconnections. Second, the compressibility of the composition allows for deviations from the specification of the distance between the adjacent ends of the optical waveguides and provides a continuous optical medium that is void of air bubbles that can cause reflection or scattering of light in the connection.

Referring to FIG. 2, the benefits of the present invention are easily explained. For instance, as shown in FIG. 2, the elastomeric composition of the present invention fixedly resides between the abutting portions of the fiber casings 82 and 80 which include optical waveguides 28 and 30. Because of the compressible nature of the elastomeric composition, a "bumper" is provided between the abutting ends of the waveguides which provides a cushion to prevent damage of the delicate waveguides and casing as they are connected or disconnected. The soft, pliable nature of the elastomeric composition 40 prevents damage to the opposing connection end that is generally unprotected from shearing and abasive forces.

The mixture of the oligomers, monomer, adhesion promoter and initiator is prepared by conventional means such as combining the components under room conditions in a round bottom flask and stirring using an overhead stirrer. The uncured elastomeric composition is applied to the end of an optical waveguide so that the thickness of the cured elastomeric composition can be controlled such that the adjacent ends of the optical waveguides can be positioned closely together. Preferably, the thickness of the cured elastomeric composition is less than about 200 microns. Though not intended to be limited to any particular method, one method of applying the elastomeric composition to the end of the optical waveguide uses a microautomatic liquid dispenser, similar to those used in the art of screen printing, that applies a predetermined volume of the elastomeric composition to the end of the optical waveguide. The viscosity and surface tension of the composition provides a uniform disc of material covering the end of the waveguide and the casing surrounding the waveguide.

The elastomeric composition is then cured on the end of optical waveguide in situ. Where the preferred ultraviolet initiator is used, the elastomeric composition is cured under an ultraviolet lamp at low intensity. With an ultraviolet initiator, such as Darocur TM 1173, the curing time generally ranges from about 9 to about 11 minutes, preferably about 10 minutes. The completion of curing is generally indicated by the uncured elstomeric composition becoming a transparent, elastic composition.

It is to be understood that modifications and changes to the preferred embodiment of the invention herein described and shown can be made without departing from the spirit and scope of the invention. The following examples are set forth to illustrate the invention; however, the examples are not intended as limitations thereof.

EXAMPLE 1

A series of elastomeric compositions are prepared from PurElast TM 155 oligomer, PurElast TM 155A oligomer, Sartomer TM 256E, acrylic acid and Darocur TM 1173 by combining the components in a round bottom flask and stirring using an overhead stirrer. The mixing is done at room temperature. The specific amounts of each component are summarized in Table 2 with their respective index of refraction as measured by an ABBE Refractometer. The samples are then subjected to 10 minutes to an ultraviolet light source at low intensity to cure the composition. The ultraviolet light source is a 6 inch diameter concave lamp having a focal length of 1.5 inches and positioned 6.5 inches above the samples. The index of refraction of the cured compositions are determined as described above.

TABLE 2

| COMPONENT | WT % | | | |
|---|---|---|---|---|
| | A | B | C | D |
| PurElast TM 155 A | 35.8 | 45.6 | 30.4 | 26.4 |
| PurElast TM 155 | 17.9 | 15.0 | 30.3 | 13.2 |
| Sartomer TM 256 | 35.8 | 30.4 | 30.4 | 52.7 |
| Acrylic Acid | 3.5 | 3.0 | 3.0 | 2.6 |
| Darocur TM 1173 | 7.0 | 5.9 | 5.9 | 5.1 |
| INDEX OF REFRACTION | | | | |
| Uncured | 1.483 | 1.489 | 1.489 | 1.470 |
| Cured | 1.498 | 1.508 | 1.507 | 1.488 |

The data summarized in Table 4 illustrates the ability to control the index of refraction by changing the ratio of the components in the elastomeric composition.

One of ordinary skill, after reading the foregoing specification, will be able to effect various changes, substitutions of equivalents and other alterations without departing from the broad concepts disclosed herein. It is therefore intended that the scope of Letters Patent granted hereon will be limited only by the definition contained in the appended claims and equivalents thereof.

The embodiments of the invention in which an exclusive property or privilege is claimed as defined as follows:

1. In a method of coupling a first end of a primary optical waveguide to a first end of a secondary optical waveguide wherein the optical waveguides have an index of refraction $n_3$, the improvement comprises:
   (a) formulating an elastomeric composition, the elastomeric composition having an index of refraction $n_2$ in the cured state such that $n_2$ is substantially equal to the index of refraction $n_3$ of the optical waveguides;
   (b) applying the elastomeric composition to the first end of the primary optical waveguide; and
   (c) subjecting the elastomeric composition to curing conditions.

2. The method of claim 1, wherein the elastomeric composition is formulated by admixing:
   (1) a difunctional oligomer;
   (2) a monofunctional oligomer;
   (3) a monofunctional monomer; and
   (4) an adhesion agent.

3. The method of claim 2, wherein the elastomeric composition is formulated by admixing (1), (2), (3) and (4) with:
   (5) a photo-initiator.

4. The method of claim 2, wherein the difunctional oligomer is unsaturated such that it can form crosslinks between the monofunctional components of the elastomeric composition.

5. The method of claim 4, wherein the monofunctional oligomer and monofunctional monomer are mono-unsaturated such that the difunctional oligomer can form crosslinks between the monofunctional components of the elastomeric composition.

6. The method of claim 2, wherein step (c) further comprises:
(c) subjecting the elastomeric composition to curing conditions such that the difunctional oligomer forms crosslinks between the monofunctional components of the elastomeric composition.

7. The method of claim 6, wherein the cured elastomeric composition provides an optical interface between the first end of the primary optical waveguide and the first end of the secondary optical waveguide, the cured elastomeric composition remaining stable after multiple couplings and uncouplings of the primary optical waveguide to the secondary optical waveguide.

8. The method of claim 1, wherein the cured elastomeric composition of step (c) adheres to the first end of the primary optical waveguide.

9. The method of claim 1, wherein the index of refraction $n_2$ of the cured elastomeric composition and the index of refraction $n_3$ of the waveguides are such that the reflection and scattering of transmitted light at the interface of the primary optical waveguide and the secondary optical waveguide with the elastomeric composition is minimized.

10. The method of claim 1, wherein the elastomeric composition is an uncured state has an index of refraction $n_1$ that is about 0.01 to about 0.02 units less than the index of refraction $n_3$ of the primary optical waveguide.

11. The method of claim 9, wherein the second end of the secondary optical waveguide is coupled to a light source.

12. The method of claim 11, wherein the amount of transmitted light reflected and scattered at the interface of the primary optical waveguide and the secondary optical waveguide with the elastomeric composition is less than about 0.01 percent of the total amount of light transmitted through the secondary optical waveguide.

13. The method of claim 1, wherein the elastomeric composition of step (a) is applied to the first end of the primary optical waveguide such that the cured elastomeric composition of step (c) protects the first end of the primary optical waveguide from surface damage.

14. The method of claim 13, wherein the cured elastomeric composition of step (c) protects the first end of the secondary optical waveguide from surface damage.

15. The method of claim 1, further comprising:
(d) optically aligning the first end of the primary optical waveguide and the first end of the secondary optical waveguide so that the amount of transmitted light reflected and scattered at the interface of the primary optical waveguide and the secondary optical waveguide and the cured elastomeric composition is minimized.

16. The method of claim 3, wherein step (c) comprises subjecting the elastomeric composition to curing conditions by applying low intensity ultraviolet light to the elastomeric composition.

17. The method of claim 1, wherein the elastomeric composition applied to the first end of the primary optical waveguide in step (c) is applied in a predetermined volume, such that the cured layer of the elastomeric composition has a thickness less than 200 microns.

18. A method of reversibly coupling a primary optical waveguide to a secondary optical waveguide, wherein the optical waveguides have an index of refraction $n_3$, comprising the steps:
(a) formulating an elastomeric composition, the elastomeric composition having an index of refraction $n_2$ in the cured state such that $n_2$ is substantially equal to the index of refraction $n_3$ of the optical waveguides;
(b) applying the elastomeric composition to the first end of the primary optical waveguide;
(c) subjecting the elastomeric composition to curing conditions; and
(d) optically aligning the first end of the primary optical waveguide and the first end of the secondary optical waveguide so as to minimize the reflection and scattering of transmitted light at the interface of the primary optical waveguide and the secondary optical waveguide with the elastomeric composition.

19. The method of claim 18, wherein the cured elastomeric composition of step (c) adheres to the first end of the primary optical waveguide.

20. The method of claim 1, wherein $n_3$ ranges between about 1.45 to 1.55.

21. A fiber optic connector comprising:
(a) a first body part for receiving and retaining at least one longitudinal primary optical waveguide, the first body part having a longitudinal axis and a fore and an aft end and the primary optical waveguide having a first and a second end, the first end of the primary optical waveguide terminating proximate the fore end of the first body part;
(b) a second body part for receiving and retaining at least one secondary optical waveguide, the second body part having a longitudinal axis and a fore and an aft end and the secondary optical waveguide having a first and a second end, the first end of the secondary optical waveguide terminating proximate the fore end of the second body part, the second body part capable of mating with the first body part such that the first ends of the optical waveguides are proximate each other and are longitudinally aligned; and
(c) an elastomeric composition adhered to at least the first end of the primary optical waveguide.

22. In a method of coupling a first end of a primary optical waveguide to a first end of a secondary optical waveguide wherein the optical waveguides have an index of refraction $n_3$, the improvement comprises:
(a) formulating an uncured elastomeric composition, the elastomeric composition having an index of refraction $n_2$ in the cured state such that $n_2$ is substantially equal to the index of refraction $n_3$ of the optical waveguides;
(b) applying the uncured elastomeric composition to the first end of the primary optical waveguide; and
(c) subjecting the uncured elastomeric composition to curing conditions.

23. In a method of coupling a first end of a primary optical waveguide to a first end of a secondary optical waveguide wherein the optical waveguides have an index of refraction $n_3$, the improvement comprises:
(a) formulating an uncured elastomeric composition, the elastomeric composition having an index of refraction $n_2$ in the cured state such that $n_2$ is substantially equal to the index of refraction $n_3$ of the optical waveguides;
(b) applying the uncured elastomeric composition to the first end of the primary optical waveguide; and
(c) subjecting the uncured elastomeric composition to curing conditions, such that the uncured elastomeric composition is cured, the cured elastomeric composition adhering to the first end of the primary optical waveguide.

* * * * *

UNITED STATES PATENT AND TRADEMARK OFFICE
CERTIFICATE OF CORRECTION

PATENT NO. : 4,900,125

DATED : February 13, 1990

INVENTOR(S) : Lokanathan M. Iyer

It is certified that error appears in the above-identified patent and that said Letters Patent is hereby corrected as shown below:

| Column | Line | Error |
|---|---|---|
| 1 | 11 | "electronic" should be --electronics-- |
| 2 | 7 | after "of" delete "the" |
| 2 | 39 | "second" should be --secondary-- |
| 2 | 60 | "effective" should be --effectively-- |
| 3 | 6 | "effected" should be --affected-- |
| 3 | 10 | "optical" should be --optic-- |
| 3 | 23 | "an" should be --any-- |
| 3 | 28 | after "generally" insert "of" |
| 3 | 59 | "FIGSS." should be --FIGURES-- |
| 6 | 41 | "PurElast#" should be --PurElast™-- |
| 7 | 67 | "PurELast™" should be --PurElast™-- |
| 8 | 18 | "10wt%" should be --10 wt%-- |
| 9 | 29 | "abasive" should be --abrasive-- |
| 9 | 59&60 | "elstom-eric" should be --elastomeric-- |
| 10 | 5 | "256E," should be --256-- |
| 10 | 30 | "Table 4" should be --Table 2-- |
| 11 | 33 | "is" should be --in-- |
| 12 | 10 | "n 3" should be --$n_3$-- |

Signed and Sealed this

Thirteenth Day of August, 1991

*Attest:*

HARRY F. MANBECK, JR.

*Attesting Officer*  *Commissioner of Patents and Trademarks*